United States Patent
Wang et al.

(10) Patent No.: US 11,042,233 B2
(45) Date of Patent: Jun. 22, 2021

(54) FINGER-MOUNTED DEVICE WITH FABRIC

(71) Applicant: Apple Inc., Cupertino, CA (US)

(72) Inventors: Paul X. Wang, Cupertino, CA (US);
Yoonhoo Jo, San Francisco, CA (US);
James A. Stryker, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/141,805

(22) Filed: Sep. 25, 2018

(65) Prior Publication Data
US 2019/0346938 A1    Nov. 14, 2019

Related U.S. Application Data

(60) Provisional application No. 62/669,278, filed on May 9, 2018.

(51) Int. Cl.
*G06F 3/038* (2013.01)
*G06F 3/01* (2006.01)
(Continued)

(52) U.S. Cl.
CPC .......... *G06F 3/038* (2013.01); *D03D 1/0088* (2013.01); *G06F 3/016* (2013.01); *G06F 3/0308* (2013.01);
(Continued)

(58) Field of Classification Search
CPC ........ G06F 3/038; G06F 3/0308; G06F 3/016; G06F 3/044; G06F 2203/0331; D03D 2700/0166; D03D 1/0088; D10B 2401/16
See application file for complete search history.

(56) References Cited

U.S. PATENT DOCUMENTS

| 2,553,070 A | 5/1951 | Megroot |
| 4,659,873 A * | 4/1987 | Gibson .................. H01H 3/141 178/18.05 |

(Continued)

FOREIGN PATENT DOCUMENTS

| JP | 2001104256 A | 4/2001 |
| JP | 2008171409 A | 7/2008 |

(Continued)

OTHER PUBLICATIONS

Paul X. Wang et al., U.S. Appl. No. 16/015,043, filed Jun. 21, 2018.
(Continued)

*Primary Examiner* — Chad M Dicke
(74) *Attorney, Agent, or Firm* — Treyz Law Group, P.C.; Kendall W. Abbasi

(57) ABSTRACT

A finger-mounted electronic device may include a body that serves as a support structure for components such as force sensors, accelerometers, and other sensors and for haptic output devices. The body may have first and second side body members that leave the finger pad exposed and an upper body member extending between the first and second side body members. Some or all of the body may be covered in fabric or leather. Fabric may wrap around the first and second side body members and may extend across the upper body member. The fabric may cover electronic components. A touch sensor may have electrodes that are formed from conductive material on the fabric or conductive strands in the fabric. Infrared-reflective ink may form visual markers on the fabric for an infrared tracking system. The fabric may have light-transmissive portions that overlap optical components.

20 Claims, 9 Drawing Sheets

(51) Int. Cl.
   *G06F 3/044*     (2006.01)
   *G06F 3/03*      (2006.01)
   *D03D 1/00*      (2006.01)

(52) U.S. Cl.
   CPC ..... *G06F 3/044* (2013.01); *D03D 2700/0166* (2013.01); *D10B 2401/16* (2013.01); *G06F 2203/0331* (2013.01)

(56) References Cited

U.S. PATENT DOCUMENTS

| | | | |
|---|---|---|---|
| 5,581,484 A | 12/1996 | Prince | |
| 5,631,861 A | 5/1997 | Kramer | |
| 5,727,574 A * | 3/1998 | Frye | A45D 2/00 132/210 |
| 6,388,247 B2 | 5/2002 | Asada et al. | |
| 8,082,762 B2 * | 12/2011 | Burr | D04B 1/243 66/175 |
| 8,368,641 B2 | 2/2013 | Tremblay et al. | |
| 8,724,861 B1 | 5/2014 | Sun | |
| 8,991,917 B2 * | 3/2015 | Kato | B60N 2/002 297/217.2 |
| 9,104,271 B1 | 8/2015 | Adams et al. | |
| 9,110,505 B2 | 8/2015 | Mastandrea | |
| 9,894,789 B1 * | 2/2018 | Hamada | B32B 37/12 |
| 10,037,054 B2 * | 7/2018 | Corbin | B60R 11/0252 |
| 10,056,205 B2 * | 8/2018 | Hegde | G06F 1/1662 |
| 10,061,462 B2 * | 8/2018 | McDermid | D03D 15/0094 |
| 10,155,274 B2 * | 12/2018 | Robinson | A41D 1/005 |
| 10,228,801 B2 * | 3/2019 | Robucci | G06F 3/044 |
| 10,261,592 B2 * | 4/2019 | Keller | G06F 3/017 |
| 2002/0139140 A1 * | 10/2002 | Schaab | A61L 9/12 63/3 |
| 2003/0098035 A1 | 5/2003 | Hildebrandt | |
| 2003/0129905 A1 * | 7/2003 | Dhawan | B01D 39/086 442/316 |
| 2003/0142065 A1 * | 7/2003 | Pahlavan | G06F 3/0346 345/156 |
| 2005/0052412 A1 * | 3/2005 | McRae | G06F 3/014 345/158 |
| 2005/0199250 A1 * | 9/2005 | Green, II | A61B 34/20 128/899 |
| 2006/0001646 A1 * | 1/2006 | Hai | G06F 3/014 345/156 |
| 2006/0203621 A1 * | 9/2006 | Brodmann | A44C 9/0038 368/281 |
| 2007/0016288 A1 * | 1/2007 | Gurskis | A61F 2/2436 623/2.11 |
| 2008/0210724 A1 | 9/2008 | Geis et al. | |
| 2009/0229033 A1 * | 9/2009 | Mertz | A41D 13/04 2/69 |
| 2009/0278798 A1 * | 11/2009 | Kim | G06F 3/014 345/158 |
| 2011/0047672 A1 * | 3/2011 | Hatfield | G06F 3/014 2/163 |
| 2011/0199305 A1 * | 8/2011 | Suh | G06F 3/014 345/158 |
| 2011/0213664 A1 | 9/2011 | Osterhout et al. | |
| 2012/0128995 A1 * | 5/2012 | Leto | D06M 11/83 428/473 |
| 2012/0137403 A1 * | 6/2012 | Bone | A41D 13/087 2/163 |
| 2012/0293410 A1 * | 11/2012 | Bell | G06F 3/014 345/158 |
| 2013/0027362 A1 * | 1/2013 | Lee | A41D 19/0024 345/179 |
| 2013/0102217 A1 * | 4/2013 | Jeon | D03D 15/02 442/182 |
| 2013/0104278 A1 * | 5/2013 | Christopherson | G06F 3/039 2/69 |
| 2013/0192013 A1 * | 8/2013 | Clausen | A47L 25/00 15/210.1 |
| 2013/0260630 A1 * | 10/2013 | Ito | D03D 15/04 442/205 |
| 2013/0291586 A1 * | 11/2013 | Koeppel | A44C 5/0084 63/1.13 |
| 2014/0033396 A1 * | 2/2014 | Hatfield | G06F 3/03545 2/163 |
| 2014/0165262 A1 * | 6/2014 | Klausner | G06F 3/014 2/161.1 |
| 2014/0267116 A1 * | 9/2014 | Weiner | G06F 3/0416 345/173 |
| 2016/0033994 A1 * | 2/2016 | Rothkopf | G06F 1/1635 345/173 |
| 2016/0037835 A1 * | 2/2016 | Mertz | A41B 13/10 2/48 |
| 2016/0124508 A1 * | 5/2016 | Williams | G06F 3/014 2/167 |
| 2016/0209920 A1 * | 7/2016 | Mastandrea | G06F 3/03547 |
| 2016/0278665 A1 * | 9/2016 | Ferreira | A61B 5/0053 |
| 2016/0313798 A1 | 10/2016 | Connor | |
| 2017/0107647 A1 * | 4/2017 | Riethmuller | D02G 3/441 |
| 2017/0113132 A1 | 4/2017 | Mortazavi | |
| 2017/0123487 A1 | 5/2017 | Hazra et al. | |
| 2017/0215495 A1 * | 8/2017 | Okumiya | G01B 7/18 |
| 2017/0347021 A1 * | 11/2017 | Kawai | G06F 3/014 |
| 2018/0052428 A1 * | 2/2018 | Abramov | G06F 3/016 |
| 2018/0102030 A1 * | 4/2018 | Khoshkava | G08B 6/00 |
| 2018/0358541 A1 * | 12/2018 | Tajitsu | H01L 41/082 |
| 2019/0025953 A1 * | 1/2019 | Ma | G06F 1/163 |
| 2019/0069654 A1 * | 3/2019 | Chen | A45B 25/22 |

FOREIGN PATENT DOCUMENTS

| | | |
|---|---|---|
| JP | 2014142751 A | 8/2014 |
| JP | 2015521303 A | 7/2015 |
| JP | 2015219887 A | 12/2015 |
| JP | 2016033815 A | 3/2016 |
| JP | 2016118929 A | 6/2016 |
| WO | 2012176610 A1 | 12/2012 |

OTHER PUBLICATIONS

Hutson, Finger devices let users 'touch' virtual objects, Science, AAAS, Apr. 25, 2017, 4 pages.
Girard et al., HapTip: Displaying Haptic Shear Forces at the Fingertips for Multi-Finger Interaction in Virtual Environments, Frontiers in ICT, vol. 3, Article 6, Apr. 2016, 15 pages.

* cited by examiner

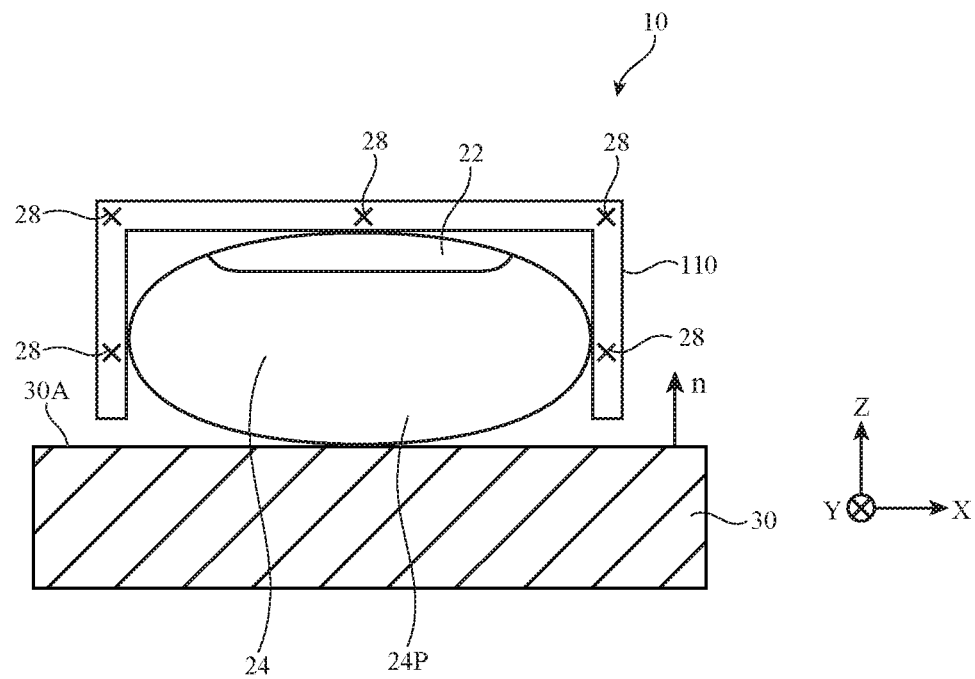
FIG. 3
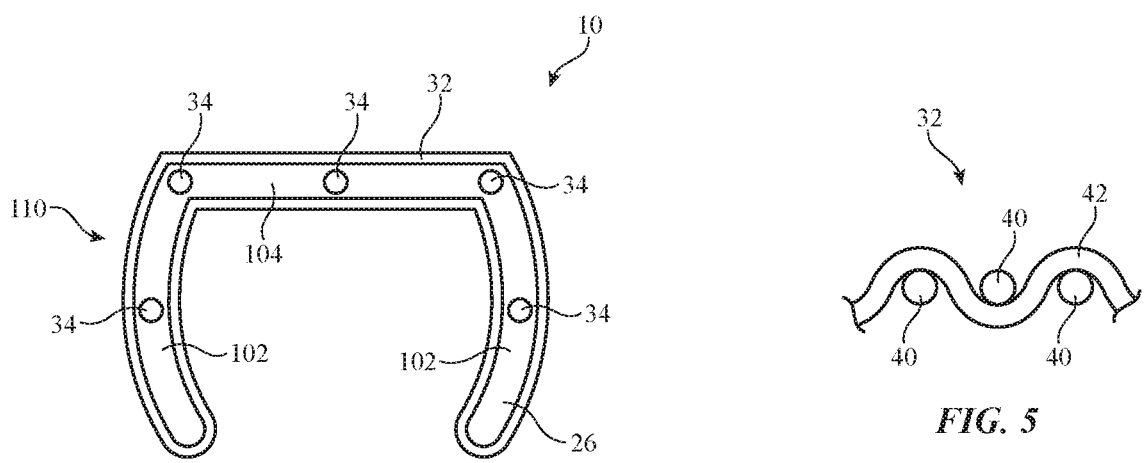
FIG. 4
FIG. 5

FINGER-MOUNTED DEVICE WITH FABRIC

This application claims the benefit of provisional patent application No. 62/669,278, filed May 9, 2018, which is hereby incorporated by reference herein in its entirety.

FIELD

This relates generally to electronic devices, and, more particularly, to wearable electronic devices.

BACKGROUND

Electronic equipment such as computers and head-mounted display systems are sometimes controlled using input-output devices such as gloves. A glove may have sensors that detect user hand motions. The user hand motions can be used in controlling electronic equipment.

The use of wearable devices to gather input for controlling electronic equipment can pose challenges. If care is not taken, a device such as a glove may affect the ability of a user to feel objects in the user's surroundings, may be uncomfortable to use, or may not gather suitable input from the user.

SUMMARY

A system may include one or more finger-mounted electronic devices such as finger devices with U-shaped housings configured to be mounted on a user's fingers while gathering sensor input and supplying haptic output. The finger-mounted devices may each have a body. The body serves as a support structure for components such as force sensors, accelerometers, and other sensors and for haptic output devices. During operation, a user may wear the finger mounted units on the tips of the user's fingers while interacting with external objects.

The body of a finger-mounted electronic device may have first and second side body members that leave the finger pad exposed and an upper body member extending between the first and second side body members. Some or all of the body may be covered in fabric or leather. Fabric may wrap around the first and second side body members and may extend across the upper body member. The fabric may cover electronic components. A touch sensor may have electrodes that are formed from conductive material on the fabric or conductive strands in the fabric. Infrared-reflective ink may form visual markers on the fabric for an infrared tracking system. The fabric may have light-transmissive portions that overlap optical components. The fabric may have breathability features such as pits, bumps, or through-holes.

The fabric may be attached to the body using wrapping techniques, intertwining techniques, adhesive attachment methods, molding attachment methods, or other suitable techniques.

BRIEF DESCRIPTION OF THE DRAWINGS

FIG. 3 is a cross-sectional side view of an illustrative finger device on the finger of a user in accordance with an embodiment.

FIG. 4 is a cross-sectional side view of an illustrative finger device having a fabric or leather layer in accordance with an embodiment.

FIG. 5 is a cross-sectional side view of an illustrative fabric that may be used in a finger device in accordance with an embodiment.

DETAILED DESCRIPTION

Electronic devices that are configured to be mounted on the body of a user may be used to gather user input and to provide a user with output. For example, electronic devices that are configured to be worn on one or more of a user's fingers, which are sometimes referred to as finger devices or finger-mounted devices, may be used to gather user input and to supply output. A finger device may, as an example, include an inertial measurement unit with an accelerometer for gathering information on figure motions such as finger taps or free-space finger gestures, may include force sensors for gathering information on normal and shear forces in the finger device and the user's finger, and may include other sensors for gathering information on the interactions between the finger device (and the user's finger on which the device is mounted) and the surrounding environment. The finger device may include one or more haptic output devices to provide the user's finger with haptic output and may include other output components.

One or more finger devices may gather user input from a user. The user may use finger devices in operating a virtual reality or mixed reality device (e.g., head-mounted equipment such as glasses, goggles, a helmet, or other device with a display). During operation, the finger devices may gather user input such as information on interactions between the finger device(s) and the surrounding environment (e.g., interactions between a user's fingers and the environment, including finger motions and other interactions associated with virtual content displayed for a user). The user input may be used in controlling visual output on the display. Corresponding haptic output may be provided to the user's fingers using the finger devices. Haptic output may be used, for example, to provide the fingers of a user with a desired texture sensation as a user is touching a real object or as a user is touching a virtual object.

Finger devices can be worn on any or all of a user's fingers (e.g., the index finger, the index finger and thumb, three of a user's fingers on one of the user's hands, some or all fingers on both hands, etc.). To enhance the sensitivity of a user's touch as the user interacts with surrounding objects, finger devices may have inverted U shapes or other configurations that allow the finger devices to be worn over the top and sides of a user's finger tips while leaving the user's finger pads exposed. This allows a user to touch objects with the finger pad portions of the user's fingers during use. Users can use the finger devices to interact with any suitable electronic equipment. For example, a user may use one or more finger devices to interact with a virtual reality or mixed reality system (e.g., a head-mounted device with a display), to supply input to a desktop computer, tablet computer, cellular telephone, watch, ear buds, or other accessory, or to interact with other electronic equipment.

Figure 1:
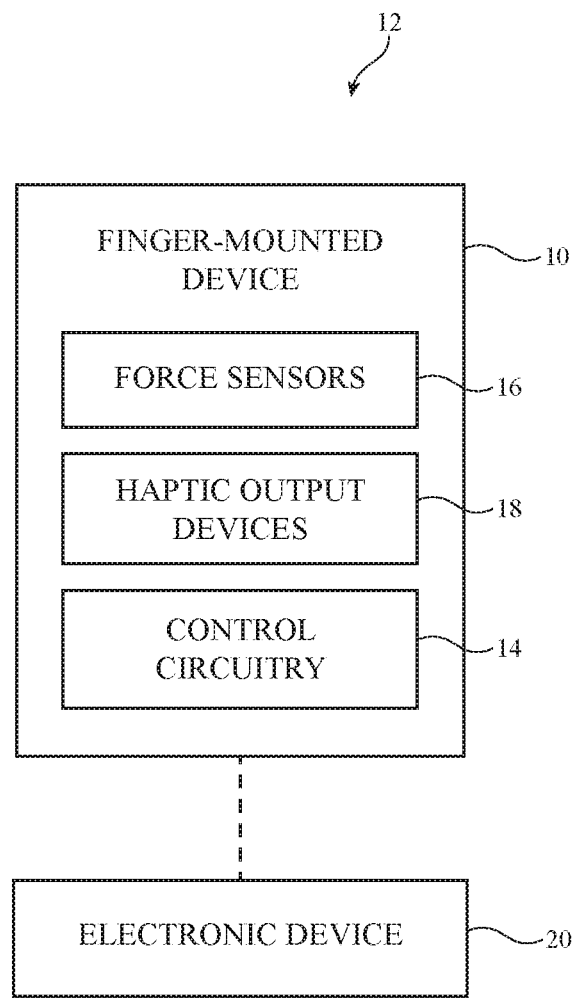
FIG. 1 is a schematic diagram of an illustrative system with a finger device in accordance with an embodiment.

FIG. 1 is a diagram of an illustrative system that includes a wearable device such as a finger-mounted device. As shown in FIG. 1, system 12 may include a finger-mounted device such as device 10 that interacts with electronic equipment such as electronic device 20. Finger-mounted device 10 may include sensors such as force sensors 16, haptic output devices 18, and control circuitry 14. Components such as these may be mounted on the body parts of a user (e.g., on a user's fingertips) using housing structures (sometimes referred to as body structures or body members). Housing structures may be formed for portions of device 10 that reside on one or more fingers. For example, device 10 may include a separate body member and associated components for each of multiple different fingers of a user. The housing structures may be formed from metal, polymer, fabric, glass, ceramic, other materials, or combinations of these materials. In some configurations, wireless or wired links may be used to route signals to and from fingertip components to other portions of device 10 (e.g., a portion of device 10 that is located on the rear of a user's hand, etc.).

If desired, device 10 may include input-output devices other than force sensors 16. For example, device 10 may include optical sensors (e.g., sensors that detect light or sensors that emit light and detect reflected light), image sensors, status indicator lights and displays (e.g., light-based components such as light-emitting diodes that emit one or more regions of light, pixel arrays for displaying images, text, and graphics, etc.), may include buttons (e.g., power buttons and other control buttons), audio components (e.g., microphones, speakers, tone generators, etc.), touch sensors, sensors for detecting position, orientation, and/or motion (e.g., accelerometers, magnetic sensors such as compass sensors, gyroscopes, inertial measurement units that contain some or all of these sensors), muscle activity sensors (EMG) for detecting finger actions, and/or other circuitry for gathering input.

Haptic output devices 18 may be electromagnetic actuators (e.g., vibrators, linear solenoids, etc.), may be piezoelectric devices (e.g., piezoelectric devices that are separate from force sensing piezoelectric devices in device 10 and/or piezoelectric devices that serve both as haptic output devices and as force sensors), may be components that produce haptic output using heat-induced physical changes (e.g., by heating shape memory alloys), may be electroactive polymer components, or may be other suitable components that produce haptic output.

Control circuitry 14 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 14 may be used to gather input from sensors and other input devices and may be used to control output devices such as haptic output devices 18. The processing circuitry may be based on one or more microprocessors, microcontrollers, digital signal processors, baseband processors and other wireless communications circuits, power management units, audio chips, application specific integrated circuits, etc.

Control circuitry 14 may include antennas, radio-frequency transceiver circuitry, and other wireless communications circuitry and/or wired communications circuitry to support communications with external equipment such as electronic device 20. Control circuitry 14 may, for example, support bidirectional communications with device 20 over a wireless local area network link, a cellular telephone link, or other suitable wired or wireless communications link (e.g., a Bluetooth® link, a WiFi® link, a 60 GHz link, etc.). Device 20 may be, for example, a tablet computer, a desktop computer, a cellular telephone, a head-mounted device such as a head-mounted display, wearable equipment, a wrist-watch device, a set-top box, a gaming unit, a television, a display that is coupled to a desktop computer or other electronic equipment, a voice-controlled speaker, home automation equipment, an accessory (e.g., ear buds, a removable case for a portable device, etc.), or other electronic equipment. Device 20 may include input-output circuitry such as sensors, buttons, cameras, displays, and other input-output devices and may include control circuitry (e.g., control circuitry such as control circuitry 14) for controlling the operation of device 20. Device 20 may be coupled to one or more additional devices in system 12. For example, a head-mounted device with a display may be used for displaying visual content (virtual reality content and/or augmented reality content) to a user. This head-mounted device may be coupled to an electronic device such as a cellular telephone, tablet computer, laptop computer, or other equipment using wired and/or wireless communications links. Devices 20 may communicate with device 10 to gather input (e.g., user finger position information) and to provide output (e.g., using haptic output components in device).

During operation, control circuitry 14 of device 10 may use communications circuitry to transmit user input such as force sensor information and information from other sensors to device 20 to use in controlling device 20. Information from the sensors and other input devices in device 10 and/or information from device 20 may be used by control circuitry 14 in determining the strength and duration of haptic output supplied to the user with haptic output devices 18.

Device 10 may contain fabric that forms all or part of a housing wall for device 10 (e.g., a wall that forms one or more external surfaces for item device), may form internal structures for device 10, may form cosmetic structures for device 10, or may form other fabric-based structures. The fabric of device 10 may be soft (e.g., device 10 may have a fabric surface that yields to a light touch), may have a rigid feel (e.g., the device of item 10 may be formed from a stiff fabric), may be coarse, may be smooth, may have ribs or other patterned textures, may have raised and/or depressed regions formed by embossing or other techniques, and/or may be formed as part of a structure that has portions formed from non-fabric structures of plastic, metal, glass, crystalline materials, ceramics, or other materials.

Figure 2:
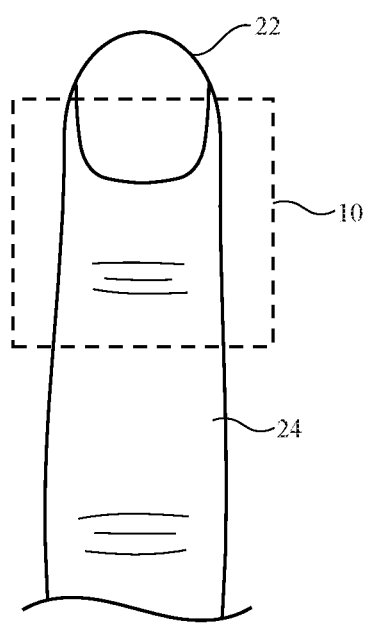
FIG. 2 is a top view of an illustrative finger of a user on which a finger device has been placed in accordance with an embodiment.

FIG. 2 is a top view of a user's finger (finger 24) and an illustrative finger-mounted device 10. As shown in FIG. 2, device 10 may be formed from a finger-mounted unit that is mounted on or near the tip of finger 24 (e.g., partly or completely overlapping fingernail 22). If desired, device 10 may be worn elsewhere on a user's fingers.

A user may wear one or more of devices 10 simultaneously. For example, a user may wear a single one of devices 10 on the user's ring finger or index finger. As another example, a user may wear a first device 10 on the user's thumb, a second device 10 on the user's index finger, and an optional third device 10 on the user's middle finger. Arrangements in which devices 10 are worn on other fingers and/or all fingers of one or both hands of a user may also be used.

Control circuitry 14 (and, if desired, other components of device 10) may be contained entirely within device 10 (e.g., in a housing for a fingertip-mounted unit) and/or may include circuitry that is coupled to a fingertip structure (e.g., by wires from an associated wrist band, glove, fingerless glove, etc.). Configurations in which devices 10 have bodies that are mounted on individual user fingertips are sometimes described herein as an example.

FIG. 3 is a cross-sectional side view of an illustrative finger device (finger-mounted device) 10 showing illustrative mounting locations 28 for electrical components (e.g., control circuitry 14, force sensors 16, haptic output devices 18, and/or other components in device 10) within and/or on the surface(s) of finger device housing 110. These components may, if desired, be incorporated into other portions of housing 110.

As shown in FIG. 3, housing 110 may have a U shape (e.g., housing 110 may be a U-shaped housing structure that faces downwardly and covers the tip of user finger 24 and fingernail 22). During operation, a user may press against structures such as structure 30. As the bottom of finger 24 (e.g., finger pulp 24P) presses against surface 30A of structure 30, the user's finger 24 may compress and force portions of the finger outwardly against the sidewall portions of housing 110 (e.g., for sensing by force sensors or other sensors mounted to the side portions of housing 110). Lateral movement of finger 24 in the X-Y plane may also be sensed using force sensors or other sensors on the sidewalls of housing 110 or other portions of housing 110 (e.g., because lateral movement will tend to press portions of finger 24 against some sensors more than others and/or will create shear forces that are measured by force sensors that are configured to sense shear forces). Ultrasonic sensors, optical sensors, inertial measurement units, and/or other sensors may be used in gathering sensor measurements indicative of the activities of finger 24.

The sensors in device 10 can measure how forcefully a user is moving device 10 (and finger 24) against surface 30A of structure 30 (e.g., in a direction parallel to the surface normal n of surface 30A such as the −Z direction of FIG. 3) and/or how forcefully a user is moving device 10 (and finger 24) within the X-Y plane, tangential to surface 30A. The direction of movement of device 10 in the X-Y plane and/or in the Z direction can also be measured by force sensors 16 and/or other sensors at locations 28.

Structure 30 may be a portion of a housing of device 24, may be a portion of another device 10 (e.g., another housing 24), may be a portion of a user's finger 24 or other body part, may be a surface of a real-world object such as a table, a movable real-world object such as a bottle or pen, or other inanimate object external to device 10, and/or may be any other structure that the user can contact with finger 24 while moving finger 24 in a desired direction with a desired force. Because motions such as these can be sensed by device 10, device(s) 10 can be used to gather pointing input (e.g., input moving a cursor or other virtual object on a display such as a display in device 20), can be used to gather tap input, swipe input, pinch-to-zoom input (e.g., when a pair of devices 10 is used), or other gesture input (e.g., finger gestures, hand gestures, arm motions, etc.), and/or other user input.

FIG. 4 is a cross-sectional side view of an illustrative finger device. As shown in FIG. 4, housing 110 may include a body such as body 26. Body 26 may be formed from metal, polymer (e.g., polycarbonate or other suitable polymer), fabric, glass, ceramic, other materials, or combinations of these materials. Body 26 may include upper body member 104 and side body members 102. Upper body member 104 may rest on the top of finger 24 (e.g., over fingernail 22). Side body members 102 may extend down the sides of finger 24 and may have shapes that help hold finger device 10 securely on finger 24. Side body members 102, which may sometimes be referred to as bent or curved arms, bent or curved protruding portions, angled housing structures, etc. may have curved cross-sectional profiles that allow these portions to conform to the curved side surfaces of finger 24 and thereby rest against these surfaces while holding housing 110 in place on finger 24. Side body members 102 may, for example, be configured to curve around left and right edge portions of the lower surface of the user's finger pad while leaving a portion of the finger pad exposed. Additional arms and/or other structures in housing 110 that help securely mount device 10 on finger 24 may be used, if desired.

Device 10 may have one or more hinges such as hinges 34. As shown in FIG. 4, hinges 34, which may sometimes be referred to as joints, may be located in upper portion 104, side portions 102, and/or between upper portion 104 and side portions 102. Hinges 34 may include friction hinges, spring-loaded hinges, freely-rotating hinge joints, other hinge structures, or a combination of these hinge structures. Hinges 34 may allow upper portion 104 and left and right side portions 102 of housing 26 to be moved towards or away from each other to accommodate fingers of different sizes. The example of FIG. 4 is merely illustrative, however. If desired, device 10 may be free of hinges, may only have a hinge in upper portion 104, may only have a hinge between upper portion 104 and side portions 102, may only have a hinge in side portions 102, or may have any other suitable hinge arrangement.

Device 10 may have one or more soft layers of material such as layer 32. Layer 32 may be fabric, leather, or other material. Arrangements in which layer 32 is a fabric layer are sometimes described herein as an example. However, it should be understood that layer 32 may be formed from any suitable fabric-like material such as leather. Layer 32 (referred to herein as fabric 32) may form part of housing 110 for device 10, may form one or more exterior surfaces of device 10, may be located internally within device 10, and/or may be incorporated in device 10 in any other suitable fashion. Fabric 32 may be integrated with device 10 or fabric 32 may be a removable fabric structure (e.g., a removable case, cover, or other structure that can be removed from and reattached to device 10). Fabric 32 may provide a comfortable interface between finger 24 and device 10. Body 26 and fabric 32 may be attached to one another in any suitable fashion. For example, fabric 32 may be wrapped around some or all of body 26, fabric 32 may be adhered to one or more portions of body 26, body 26 may be molded to fabric 32, body 26 may pass through portions of fabric 32 (e.g., strands that form fabric 32 may be intertwined around portions of body 26), and/or other suitable arrangements may be used to attach fabric 32 to body 26.

A cross-sectional side view of an illustrative layer of fabric for device 10 is shown in FIG. 5. As shown in FIG. 5, fabric 32 may be formed from intertwined strands of material such as strands 40 and strands 42. With one suitable arrangement, fabric 32 may be a woven fabric (e.g., strands 40 may be warp strands and strands 42 may be weft strands). Other arrangements may be used for intertwining strands of material for forming fabric 32 for device 10, if desired. In general, fabric 32 may be woven, knitted, braided, may be intertwined to form felt, or may contain strands of material that have been intertwined using other intertwining techniques. Fabric 32 may include one or more woven layers and/or one or more fabric layers formed from other intertwining techniques. If desired, layers of plastic and/or other materials may be coupled to one or more layers of fabric. In some arrangements, fabric 32 may include coatings (e.g., polymer coatings to prevent accumulation of dirt, materials that serve as moisture barrier layers, wear resistant coatings, transparent coatings such as patterned translucent coatings, etc.). These coating materials may penetrate into fabric 32 and/or may form layers on the inner and/or outer surfaces of fabric 32.

The strands of material that form fabric 32 may include insulating strands (e.g., polymer yarn, etc.) and conductive strands (e.g., bare wire and/or wire coated with insulation). The strands of material may be monofilaments, may be multifilament strands (sometimes referred to herein as yarns, threads, or multifilament wire), may be formed from metal (e.g., metal monofilaments and/or yarns formed from multiple monofilament wires), may be formed from dielectric (e.g., polymer monofilaments and yarns formed from multiple polymer monofilaments), may include dielectric cores covered with conductive coatings such as metal (e.g., metal coated dielectric monofilaments and yarns of metal coated polymer-core monofilaments may be used to form conductive monofilaments and conductive yarns, respectively), may include outer insulating coatings (e.g., coatings of polymers or other dielectrics may surround each metal-clad polymer monofilament or each collection of metal-clad polymer monofilaments in a yarn, polymer insulation may enclose a multifilament metal wire, etc.), or may be other suitable strands of material for forming fabric. Fabric 32 may be formed using monofilaments, multifilament strands of material (yarns), combinations of these arrangements (e.g., fabric with polymer coated wires interspersed with insulating yarn), etc. The diameter of strands 40 and 42 that are formed from yarns containing multiple monofilaments may be, for example, 0.25 mm, may be 0.1 to 0.5 mm, may be more than 0.2 mm, may be less than 2 mm, or may be any other suitable diameter (width).

In some arrangements, fabric 32 may include stretchable (elastic) strands of material. Strands 40 and/or strands 42 may, for example, be formed from an elastomeric polymer that can stretch and return elastically to its unstretched state (e.g., when strands 40 and 42 are not stretched more than their elongation-to-break limits). As an example, strands 40 and 42 may be formed from synthetic rubber or spandex (a copolymer of polyoxyethylene and polyurethane, sometimes referred to as Lycra® or elastane). Fabric 32 may instead or additionally have strands that are less stretchable, but that add strength to fabric 32. For example, strands 40 and/or strands 42 may be nylon strands or strands of other strong material. These examples are merely illustrative.

Figure 6:
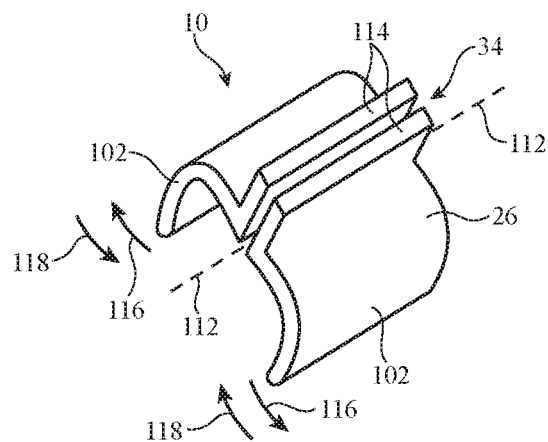
FIG. 6 is a perspective view of an illustrative finger device having first and second side body members coupled by a hinge in accordance with an embodiment.

A perspective view of an illustrative configuration for body 26 of device 10 is shown in FIG. 6. In the illustrative arrangement of FIG. 6, body 26 has first and second side body members 102 coupled by hinge 34. Hinge 34 allows side body members 102 to hinge about hinge axis 112. Hinge 34 may include protruding ridges 114 that can be pinched together to spread side body members 102 open in directions 116 and released to close in directions 118 on a user's finger 24. In other arrangements, hinge 34 may include a compressing member such as a bolt that squeezes side body members 102 together to form a friction hinge. The arrangement of FIG. 6 is merely illustrative.

Figure 7:
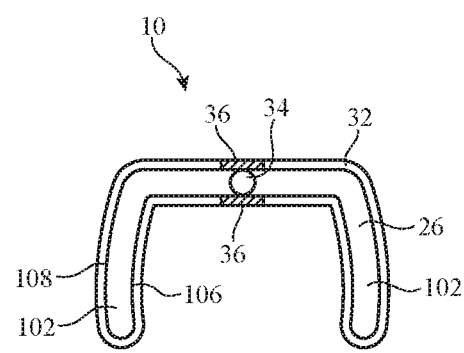
FIG. 7 is a cross-sectional side view of an illustrative finger device having fabric that wraps around first and second side body members in accordance with an embodiment.

FIG. 7 shows how a body of device 10 (e.g., a body of the type shown in FIG. 6 or body having other suitable structure) may be covered in fabric. As shown in FIG. 7, fabric 26 may be wrapped around body 26 to cover inner surfaces 106 of device 10 and outer surfaces 108 of device 10. If desired, gaps 36 may be formed in fabric 32 overlapping hinge 34 to allow hinge 34 to move freely. Gaps 36 may be free of material such that hinge 34 is exposed, or gaps 36 may include a material that covers hinge 34 while still allowing hinge 34 to move freely. Material in gaps 36 may include fabric (e.g., fabric of a different type than fabric 32) or may include non-fabric materials such as polymer, metal, or other suitable material.

In the illustrative arrangement of FIG. 7, fabric 32 wraps continuously from inner surface 106 to outer surface 108. In some arrangements, fabric 32 may include strands of stretchable material such as spandex, which provides a tight fit around body 26. Fabric 32 may be attached to body 26 using adhesive or other suitable attachment techniques. If desired, some or all of the interface between body 26 and fabric 32 may be free of adhesive to allow fabric 32 to slide relative to side body members 102 as side body members move towards and away from one another.

Figure 8:
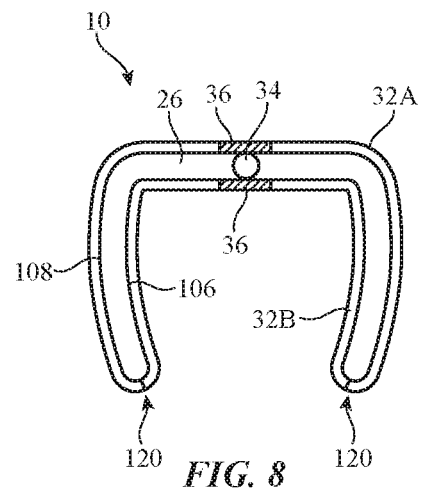
FIG. 8 is a cross-sectional side view of an illustrative finger device having a first fabric covering an interior surface of a body and a second fabric covering an exterior surface of a body in accordance with an embodiment.

FIG. 8 shows an arrangement in which fabric 32 includes multiple fabric portions such as fabric portion 32A and fabric portion 32B. Fabric portions 32A and 32B may be formed from different materials, may have different properties (e.g., different amounts of stretch, different denier values, different colors, different fabric constructions, etc.), or may be the same or similar fabrics that are separately attached to inner surface 106 and outer surface 108 of body 26. Fabric portions 32A and 32B may be attached at joints 120 using adhesive, sewing, stitching, or other suitable fabric attachment techniques.

Figure 9:
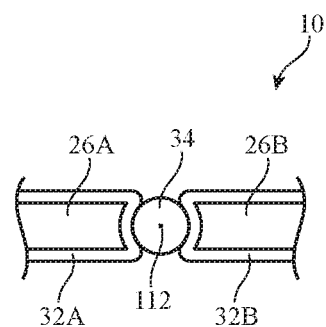
FIG. 9 is a cross-sectional side view of an illustrative finger device having a magnetic hinge between two body members that are wrapped in fabric in accordance with an embodiment.

FIG. 9 is a cross-sectional side view of a portion of device 10 showing an example in which device 10 includes a magnetic hinge. As shown in FIG. 9, body portion 26A and body portion 26B may be coupled via magnetic hinge 34. Hinge 34 and body portions 26A and 26B may be magnetized such that body portions 26A and 26B are magnetically attracted to hinge 34. This holds body portions 26A and 26B together at hinge 34 while allowing body portions 26A and 26B to rotate about hinge axis 112 (e.g., an axis extending in and out of the page of FIG. 9). Materials that may be used to form body portions 26A and 26B include neodymium alloys or other rare-earth magnetic materials, non-rare-earth ferromagnetic or ferromagnetic magnetic materials, or other magnetic material. In one illustrative arrangement, body portions 26A and 26B may be formed from ferromagnetic material and hinge 34 may be formed from neodymium. Other arrangements may be used, if desired.

In the example of FIG. 9, each body portion 26A and 26B is wrapped in a separate fabric material. Body portion 26A is wrapped in fabric 32A and body portion 26B is wrapped in fabric 32B. Fabrics 32A and 32B may be the same or different material and may have the same or different properties. Hinge 34 may be free of a fabric outer layer (as shown in the example of FIG. 9), or hinge 34 may be covered or wrapped in fabric or other material.

Figure 10:
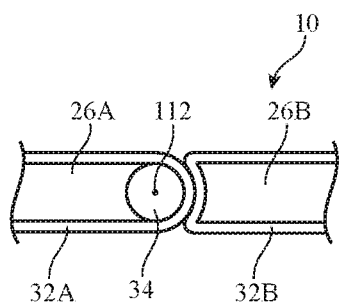
FIG. 10 is a cross-sectional side view of an illustrative finger device having first and second body members wrapped in fabric with a magnetic hinge integrated with the first body member in accordance with an embodiment.

FIG. 10 is a cross-sectional side view of a portion of device 10 showing another illustrative example of a magnetic hinge for device 10. In the arrangement of FIG. 10, hinge 34 and body portions 26A and 26B are magnetized such that body portion 26B is attracted to hinge 34 and body portion 26A. This holds body portions 26A and 26B together while allowing body portions 26A and 26B to rotate about hinge axis 112. Hinge 34 and body portion 26A may, if desired, be formed from the same material such as neodymium and body portion 26B may be formed from ferromagnetic material. Other arrangements may be used, if desired.

In the example of FIG. 10, body portion 26A and hinge 34 are wrapped in fabric 32A and body portion 26B is wrapped in fabric 32B. Fabrics 32A and 32B may be the same or different material and may have the same or different properties.

Figure 11:
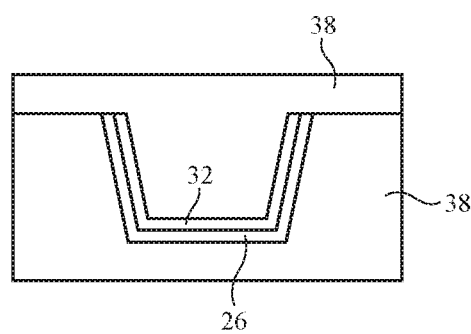
FIG. 11 is a cross-sectional side view of illustrative molding equipment that may be used to mold a body to fabric for a finger device in accordance with an embodiment.

FIG. 11 shows an illustrative method of attaching body 26 to fabric 32 of device 10. As shown in FIG. 11, fabric 32 may be placed into a molding tool such as molding tool 38. Molding tool 38 may have upper and lower molding tool structures that surround a recess. The recess may have a shape that matches the desired shape of body 26 and fabric 32. In an insert molding process (sometimes referred to as overmolding), fabric 32 may be placed into molding tool 38 and molten plastic may be injected into molding tool 38 to form body 26. As the molten plastic hardens, body 26 forms a mechanical bond with fabric 32. The use of injection molding is merely illustrative, however. If desired, other forming techniques such as compression molding or vacuum forming may be used to form body 26 and fabric 32 in the desired shape. In some arrangements, fabric 32 may itself be formed from polymers (e.g., thermoplastic or thermosetting polymer strands or coatings) that can be formed into the desired shape using molding, heat and pressure, or other forming techniques.

Figure 12:
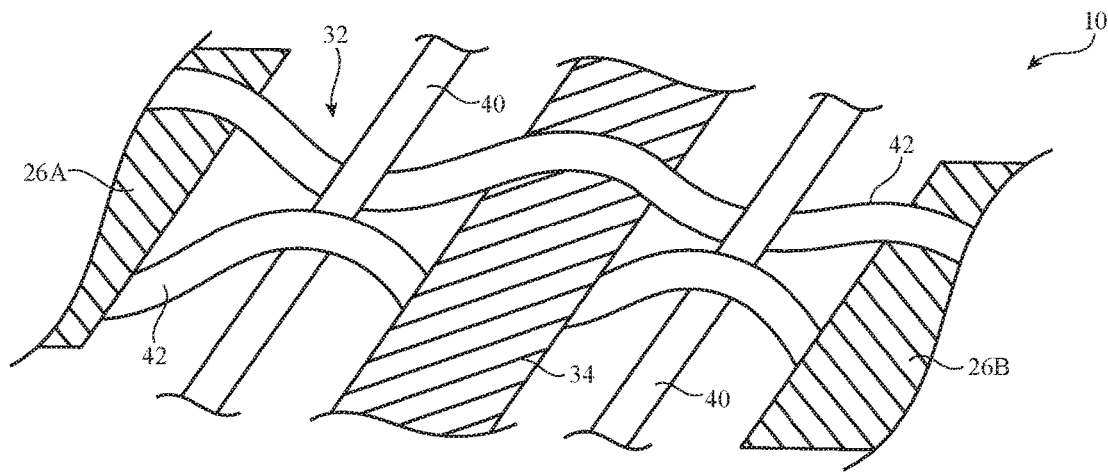
FIG. 12 is a perspective view of an illustrative finger device having fabric strands intertwined around a body and hinge in accordance with an embodiment.

FIG. 12 shows another illustrative method of attaching body 26 to fabric 32 of device 10. As shown in FIG. 12, fabric 32 may include strands 40 and 42 that are intertwined around fabric 32 portions of body 26 and/or hinge 34. Fabric 32 may be woven, knitted, braided, or otherwise intertwined around body 26 and/or hinge 34. This type of arrangement in which fabric 32 is attached to body 26 without being bonded or otherwise fixed to body 26 may allow body 26 to freely articulate about hinge axis 112 (e.g., without causing wrinkles in fabric 32)

Figure 13:
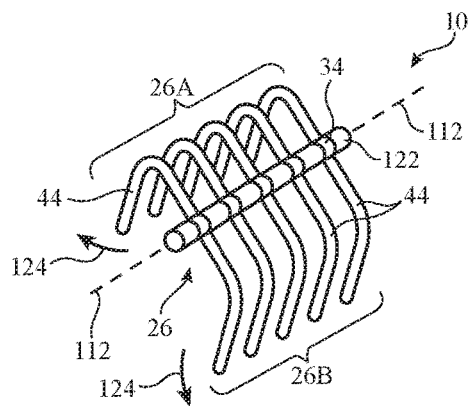
FIG. 13 is a perspective view of an illustrative finger device having ribs that can articulate independently of one another in accordance with an embodiment.

FIG. 13 shows another illustrative arrangement for body 26 and hinge 34. In the example of FIG. 13, body 26 has multiple ribs 44. Ribs 44 may be configured to articulate independently of one another about hinge axis 112. Compressing member 122 (e.g., a bolt) may squeeze portions of ribs 44 together to form a friction hinge 34 at a joint associated with axis 112. When portions 26A and 26B are spread open in directions 124 (e.g., when rotated away from each other about axis 112), device 10 will be released from finger 24. When portions 26A and 26B are rotated towards each other, portions 26A and 26B clamp down on finger 24 and hold device 10 in place on finger 24.

Fabric 32 may be attached to body 26 of FIG. 13 using any of the techniques described in connection with FIGS. 7-12 (e.g., wrapping, overmolding or insert molding, intertwining, vacuum forming, compression molding, etc.). Each rib 44 may be wrapped individually in fabric 32 or fabric 32 may extend around multiple ribs 44 (e.g. fabric 32 may extend around groups of two or more ribs 44 or may extend around all ribs 44).

Figure 14:
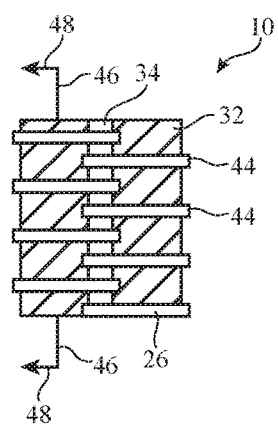
FIG. 14 is a top view of an illustrative finger device having ribs and fabric extending between the ribs in accordance with an embodiment.

FIG. 14 shows an illustrative arrangement in which body 26 and/or hinge 34 is overmolded onto fabric 32. Fabric 32 may have gaps that receive respective ribs 44 or fabric 32 may extend continuously across ribs 44. The presence of fabric 32 between ribs 44 couples ribs 44 together while still allowing some independent movement of individual ribs 44.

Figure 15:
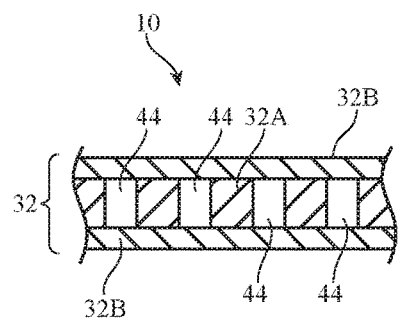
FIG. 15 is a cross-sectional side view of an illustrative finger device having ribs with a first fabric extending between the ribs and a second fabric covering the first fabric in accordance with an embodiment.

FIG. 15 is a cross-sectional side view of device 10 of FIG. 14 taken along line 46 and viewed in direction 48. As shown in FIG. 15, fabric 32 may extend between ribs 44 to form a flexible joint between adjacent ribs 44. If desired, fabric 32 may have multiple fabric portions such as fabric portion 32A and fabric portion 32B. Fabric portion 32A may be coupled between ribs 44 to form a flexible joint between ribs 44, whereas fabric portion 32B may form a covering over ribs 44 and fabric 32A. Fabric 32A and fabric 32B may be formed from the same or different materials and may have the same or different properties. Outer fabric portion 32B may, for example, form a cosmetic covering and inner fabric portion 32A may protect outer fabric portion 32B from tearing.

Figure 16:
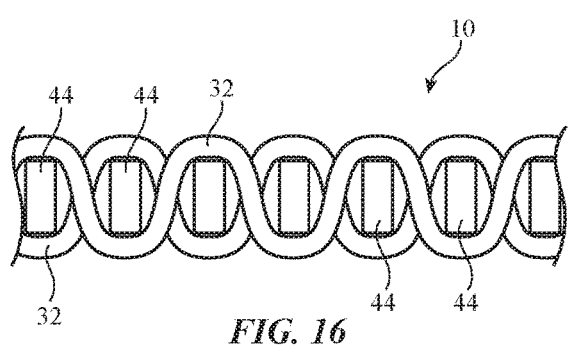
FIG. 16 is a cross-sectional side view of an illustrative finger device having fabric strands that are intertwined with ribs in accordance with an embodiment.

FIG. 16 shows an illustrative example in which fabric 32 is intertwined around ribs 44. Fabric 32 may be woven, knitted, braided, or otherwise intertwined around one or more ribs 44. This type of arrangement in which fabric 32 is attached to ribs 44 without being bonded or otherwise fixed to ribs 44 may allow ribs 44 to freely articulate about hinge axis 112.

Figure 17:
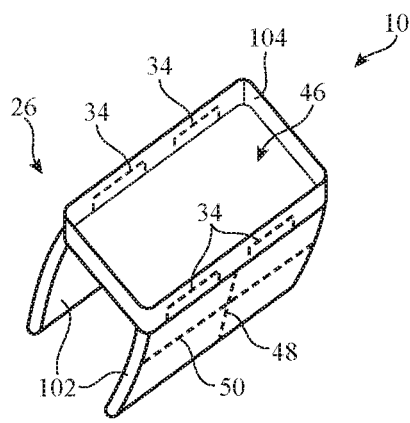
FIG. 17 is a perspective view of an illustrative finger device having first and second side body members coupled to an upper body member.

FIG. 17 shows another illustrative arrangement for body 26 of device 10. In the example of FIG. 17, body 26 has upper body member 104 and side body members 102. One or more hinges 34 are coupled between upper body member 104 and side body members 102. For example, first and second hinges 34 may couple one side body member 102 to upper body member 104, and third and fourth hinges 34 may couple an opposing side body member 102 to upper body member 104.

In one illustrative arrangement, each side body member 102 may be a solid continuous structure (e.g., similar to body members 26A and 26B of FIG. 6). In other suitable arrangements, side body members 102 may have one or more openings, gaps, or grooves that allow some portions of side body member 102 to move relative to other portions of side body member 102. For example, an opening or grooves in side body member 102 along axis 50 may allow for articulation about axis 50. An opening or groove in side body member 102 along axis 48 may allow for articulation about axis 48. Additional openings or grooves that are parallel to axis 50, parallel to axis 48, and/or oriented in other directions may be formed in side body members 102, if desired. Arrangements in which side body members 102 are formed from individual ribs of the type shown in FIG. 13 may also be used.

Upper body member 104 may surround a cavity, recess, or opening such as cavity 46. Components of device 10 (e.g., control circuitry 14 or other electronic components of device 10) may be mounted in cavity 46.

Figure 18:
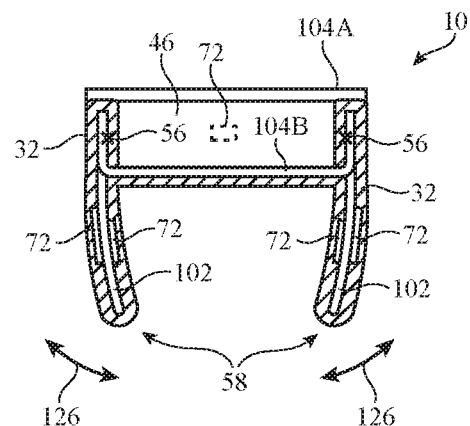
FIG. 18 is a cross-sectional side view of an illustrative finger device having a body, electronic components, and fabric covering the body and electronic components in accordance with an embodiment.
Figure 19:
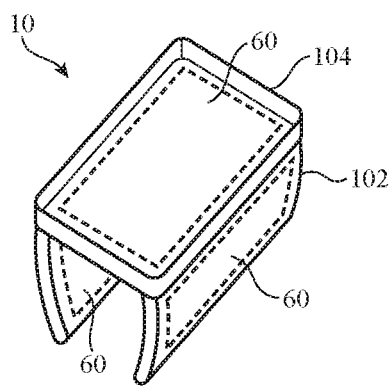
FIG. 19 is a perspective view of an illustrative finger device having one or more touch sensors in accordance with an embodiment.

FIG. 18 is a cross-sectional side view of an illustrative device 10 having a body of the type shown in FIG. 17. In the example of FIG. 18, upper body 104 has an upper portion 104A and lower portion 104B that surround cavity 46. This type of arrangement may be useful for allowing upper portion 104A to be removed so that components 72 in cavity 46 may be accessed.

Some or all of body 26 may be covered in fabric 32. In the example of FIG. 18, fabric 32 covers inner and outer surfaces of side body members 102 and also wraps up and over the side walls of upper body member 104. If desired, adhesive 56 or other attachment structures may be used to attach fabric 32 to upper body member 104 while fabric 32 is left unfixed at locations 58 on side body members 102. This allows fabric 32 to slide relative to side body members 102 as side body members 102 move inward and outward in directions 126. The ability of fabric 32 to slide across body 26 during movement of body 26 may help prevent fabric 32 from bunching up or wrinkling.

As shown in FIG. 18, components 72 may be mounted to side body members 102 and or may be mounted in cavity 46 of upper body member 104. Components 72 may be covered by fabric 32. Components 72 may include control circuitry 14, force sensors 16, and/or haptic output devices 18. Forces sensors that may be used in components 72 include force sensors such as piezoelectric force sensors, piezoelectric haptic output components, capacitive force sensors, force sensors formed from soft piezoelectric polymers, microelectromechanical systems (MEMS) force sensors, strain gauges, resistive force sensors, optical sensors that measure skin color changes due to pressure variations, and/or other force sensing components. Haptic output components that may be used in components 72 include piezoelectric haptic output components, electromagnetic actuators such as linear solenoids, motors that spin asymmetrical masses, electroactive polymers, actuators based on shape memory alloys, pneumatic actuators, and/or other haptic output components.

FIGS. 19, 20, 21, and 22 show illustrative arrangements in which a touch sensor is incorporated in device 10. As shown in the perspective view of FIG. 19, touch sensors 60 may be formed on exterior surfaces of side body members 102 (e.g., facing away from a user's finger 24), may be formed on interior surfaces of side body members 102 (e.g., facing towards a user's finger 24), and/or may be formed on upper body member 104. Touch sensors 60 may be formed on fabric 32, may be formed from conductive strands in fabric 32, may be formed under fabric 32 on a separate substrate (e.g., portions of body 26), and/or may be formed on other structures of device 10. Touch sensor 60 may sense touch and/or force using capacitive touch electrodes, soft piezoelectric polymers, microelectromechanical systems (MEMs) force sensors, a strain gauge (e.g., a planar strain gauge mounted to the surface of side body member 102), resistive force sensors, optical sensors that measure skin color changes due to pressure variations, other optical sensors, and/or other force sensing components.

Figure 20:
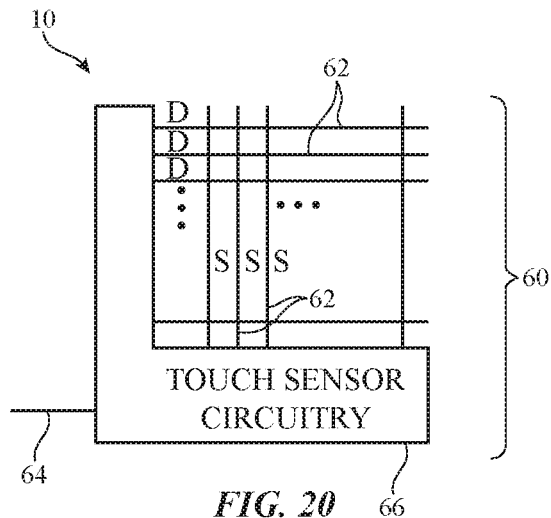
FIG. 20 is a schematic diagram of an illustrative touch sensor that may be used in a finger device in accordance with an embodiment.

FIG. 20 is a schematic diagram showing an illustrative arrangement for touch sensor 60 of device 10. As shown in FIG. 20, device 10 may include touch sensor control circuitry 66 (e.g., touch sensor control circuitry that forms part of control circuitry 14 of FIG. 1).

Conductive lines 62 may serve as capacitive electrodes in capacitive touch sensor 60 (e.g., a touch sensor grid). Conductive lines 62 may be formed from patterned thin-film metal traces on body 26 and/or fabric 32, may be formed from conductive strands of material in fabric 32, may be formed from patterned traces on a layer that is separate from fabric 32 and body 26 such as a layer of polymer or other material, and/or may be formed from other conductive structures that form capacitive touch sensor electrodes.

As shown in FIG. 20, touch sensor 60 includes touch sensor circuitry 66 coupled to a set of horizontal lines 62 and a perpendicular set of vertical lines 62. Touch sensor circuitry 66 may provide drive signals D to one of these sets of lines 62 (i.e., horizontal lines 62 in the example of FIG. 20) and may gather corresponding sense signals S on the other of these sets of lines 62 (i.e., vertical lines 62 in the example of FIG. 20). Capacitive coupling between the drive and sense lines varies in the presence of a user's finger over a drive-line-to-sense-line intersection. As a result, touch sensor circuitry 66 can process the drive and sense signals to determine which of the intersections of the horizontal and vertical lines 62 are being overlapped by a user's finger(s) or other external objects. When touch input is detected in this way, touch sensor circuitry 66 may provide a processor or other control circuitry in device 10 or other equipment with information on the touch input using a path such as path 64.

Figure 21:
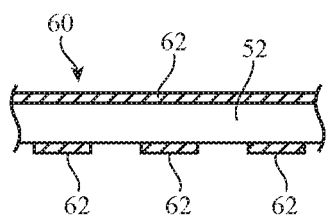
FIG. 21 is a cross-sectional side view of an illustrative touch sensor having electrodes formed from conductive material on a substrate in accordance with an embodiment.

FIG. 21 is a cross-sectional side view showing an illustrative arrangement for touch sensor 60 in which signal lines 62 are formed from conductive lines on a substrate such as substrate 52. Substrate 52 may be a portion of fabric 32, may be a portion of body 26, or may be a substrate that is separate from fabric 32 and body 26. Signals lines 62 may be formed from transparent conductive material such as indium tin oxide or may be formed from other conductive materials such as metal.

Figure 22:
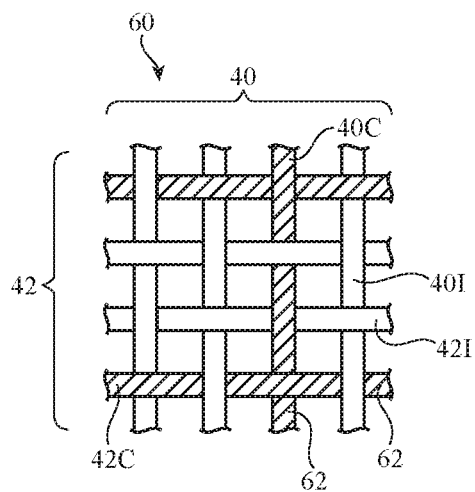
FIG. 22 is a top view of an illustrative touch sensor having electrodes formed from conductive strands in accordance with an embodiment.

FIG. 22 is a top view showing an illustrative arrangement for touch sensor 60 in which signal lines 62 are formed from conductive strands of material in fabric 32. As shown in FIG. 22, fabric 32 may include warp strands 40 and weft strands 42. Warp strands 40 run along a first dimension of fabric 32 (e.g., the vertical dimension in the orientation of FIG. 22) and weft strands 42 run perpendicularly along a second dimension of fabric 32 (e.g., the horizontal dimension in the orientation of FIG. 22). Some of warp strands 40 such as strands 40I may be insulating and some of strands 40 such as strands 40C may be conductive and may therefore serve as the vertically extending electrodes 62 in touch sensor 60. Some of weft strands 42 such as weft strands 42I may be insulating and some of strands 42 may be conductive such as strands 42C and may therefore serve as horizontally extending electrodes 62 in touch sensor 60. Woven fabric 32 of FIG. 22 has a plain weave, but in general, fabric 32 may have any suitable construction (e.g., fabric 32 may have a basket weave, may be knitted, may be braided, or may have any other suitable fabric construction).

Figure 23:
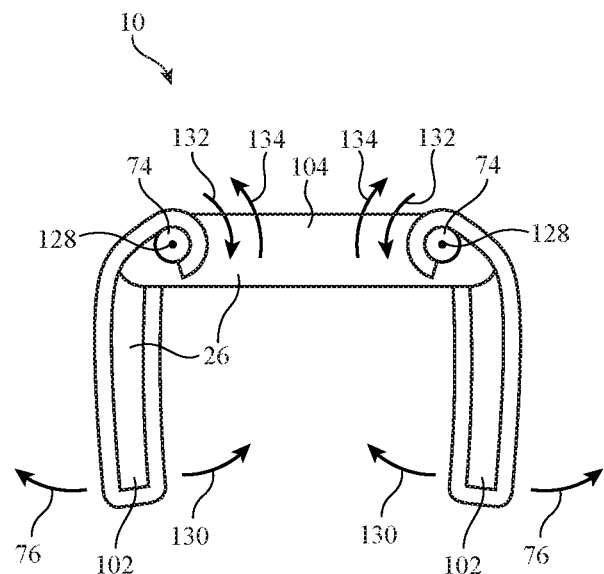
FIG. 23 is a cross-sectional side view of an illustrative finger device having actuators that move side body members by rolling and unrolling fabric in accordance with an embodiment.

FIG. 23 is a cross-sectional side view of device 10 showing another illustrative arrangement for device 10 in which fabric is used in conjunction with actuators to facilitate movement of body 26. As shown in FIG. 23, fabric 32 may wrap around side body members 102 and may extend into upper body member 104. In upper body member 104, fabric 32 may be wrapped around actuators 74. Actuators 74 may be configured to roll and unroll fabric around respective axes 128. When actuators 74 rotate about respective axes 128 in direction 132, fabric 32 is rolled up around each axis 128, causing side body members 102 to move outward in directions 76. When actuators 74 rotate about respective axes 128 in direction 134, fabric 32 is unrolled from axes 128, causing side body members 102 to move in direction 130. Actuators 74 may be controlled by control circuitry 14. Control circuitry 14 may actuate actuators 74 to move side body members 102 in direction 76 or direction 130 in response to user input, in response to sensor data, and/or in response to other information.

Figure 24:
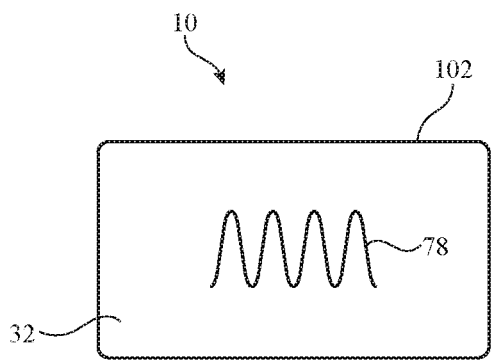
FIG. 24 is a side view of an illustrative side body member having a shape memory structure in a first state in accordance with an embodiment.
Figure 25:
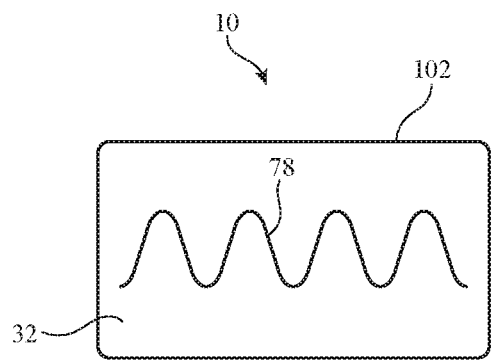
FIG. 25 is a side view of an illustrative side body member having a shape memory structure in a second state in accordance with an embodiment.

FIGS. 24 and 25 show an illustrative arrangement for device 10 in which device 10 includes shape memory materials. Shape memory structure 78 of FIG. 24 may be formed on exterior surfaces of side body members 102 (e.g., facing away form a user's finger 24), may be formed on interior surfaces of side body members 102 (e.g., facing towards a user's finger 24), and/or may be formed on upper body member 104 (not shown in FIG. 24). Shape memory structure 78 may be formed on fabric 32, may be formed from conductive strands in fabric 32, may be formed under fabric 32 on a separate substrate (e.g., portions of body 26), and/or may be formed on other structures of device 10.

Shape memory structure 78 may be formed from a shape memory substance (e.g., nitinol or other shape memory metal alloys, shape memory polymers, etc.). Control circuitry 14 may control the state of shape memory structure 78 using shape memory effects (e.g., a two-way shape memory effect). In particular, control circuitry 14 may control the state of shape memory structure 78 by controlling the temperature of shape memory structure 78 (e.g., by passing current through shape memory structure 78 using a heating element). When shape memory structure 78 is maintained at room temperature, shape memory structure 78 may have a first shape that places body 26 in a first state, as shown in FIG. 24. When shape memory structure 78 is heated to an elevated temperature (e.g., a temperature above room temperature), shape memory structure 78 may have a second shape that places body 26 in a second state, as shown in FIG. 25. For example, the first state of shape memory structure 78 shown in FIG. 24 may be a finger-mounted state where side body members 102 are spaced closer together to secure device 10 to finger 24, and the second state of shape memory structure 78 shown in FIG. 26 may be a non-finger-mounted state where side body members 102 are spaced further apart so that device 10 can be removed form finger 24. As another example, shape memory structure 78 may be manipulated to provide haptic output in the form of a shear force on the user's finger. For example, the first state of FIG. 24 may be a relaxed state where finger 24 feels no haptic output, whereas the second state of FIG. 25 may be a stretched state that produces a shear force on finger 24.

If desired, shape memory elements in device 10 may be used for fit adjustment purposes instead of or in addition to be using for providing haptic output. With this type of arrangement, control circuitry 14 may manipulate shape memory structure 78 to adjust the tightness of item 10 around finger 24. In particular, control circuitry 14 may adjust the temperature of shape memory structure 78 to expand and/or contract shape memory structure 78 so that device 10 can accommodate both larger finger diameters (e.g., by moving side body members 102 away from each other) and smaller finger diameters (e.g., by moving side body members 102 towards each other).

If desired, fabric 32 may incorporate openings, holes, recesses, grooves, or other surfaces shapes to achieve a desired level of breathability. FIGS. 26, 27, 28, 29, and 30 show illustrative arrangements for increasing the breathability of fabric 32 and device 10 using breathability features 80 in fabric 32 on side body members 102.

Figure 26:
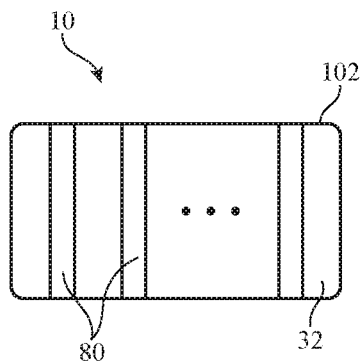
FIG. 26 is a side view of an illustrative fabric having breathability features that are shaped as elongated strips in accordance with an embodiment.

In the example of FIG. 26, breathability features 80 are formed in elongated strips on fabric 32. Breathability features 80 may extend across the length, width, and/or other dimension of fabric 32 on side body member 102. There may be one, two, three, or more than three breathability features 80 extending across side body member 102 of device 10.

Figure 27:
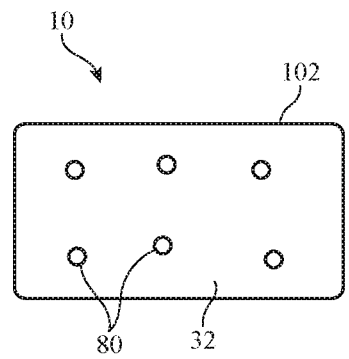
FIG. 27 is a side view of an illustrative fabric having breathability features that are shaped as isolated regions in accordance with an embodiment.

In the example of FIG. 27, breathability features 80 are formed as isolated elements in fabric 32. Breathability elements 80 may be formed in a random array, an ordered grid pattern, or other pattern.

Figure 28:
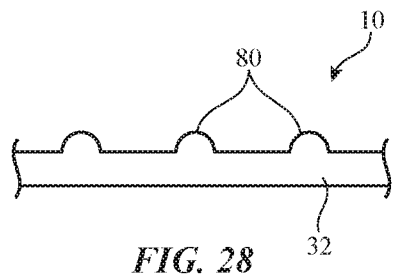
FIG. 28 is a cross-sectional side view of an illustrative fabric having breathability features formed from bumps in accordance with an embodiment.

FIG. 28 is a cross-sectional side view of fabric 32 showing how breathability features 80 of the type shown in FIGS. 26 and 27 may be formed from bumps or protrusions on the surface of fabric 32. This type of arrangement forms gaps between finger 24 and the non-protruding portions of fabric 32 between breathability features 80. Air circulation in these gaps may help increase breathability of fabric 32 of device 10.

Figure 29:
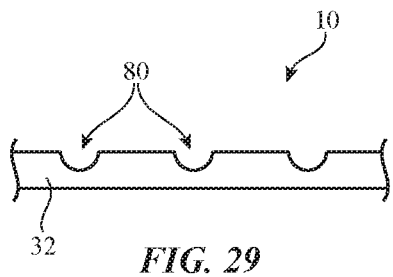
FIG. 29 is a cross-sectional side view of an illustrative fabric having breathability features formed from pits in accordance with an embodiment.

FIG. 29 is a cross-sectional side view of fabric 32 showing how breathability features 80 of the type shown in FIGS. 26 and 27 may be formed from pits or recesses in fabric 32. This type of arrangement creates gaps between finger 24 and the recesses of features 80. Air circulation in these gaps may help increase breathability of fabric 32 of device 10.

Figure 30:
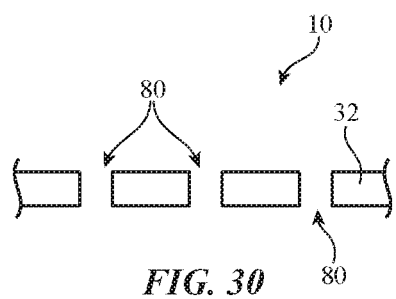
FIG. 30 is a cross-sectional side view of an illustrative fabric having breathability features formed from through-holes in accordance with an embodiment.

FIG. 30 is a cross-sectional side view of fabric 32 showing how breathability features 80 of the type shown in FIGS. 26 and 27 may be formed from through-holes in fabric 32. This allows air to circulate through fabric 32 via the holes that form features 80.

Figure 31:
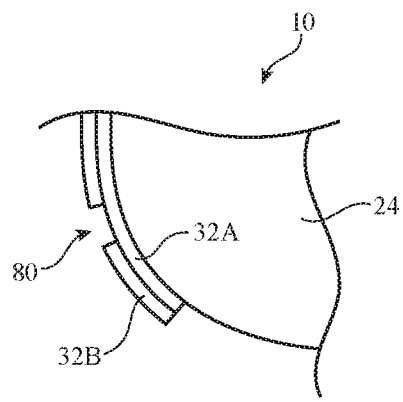
FIG. 31 is a cross-sectional side view of an illustrative finger device having a first layer that wicks moisture away from a user's finger and a second layer with openings that allow the moisture to escape in accordance with an embodiment.

FIG. 31 is a cross-sectional side view of fabric 32 on finger 24 showing how breathability features 80 may be formed from holes that pass through one of two fabric layers that form fabric 32. Fabric 32 may have first and second fabric layers 32A and 32B. Inner fabric layer 32A that rests on finger 24 may be a moisture-wicking layer that absorbs moisture adjacent to the user's skin (e.g., using a denier deferential in which the fabric closest to the user's skin has a greater denier value than fabric further away from the user's skin). Outer fabric layer 32B that faces the exterior of device 10 may have breathability features 80 formed from holes that pass through outer fabric layer 32B. This allows moisture that has been absorbed by inner fabric layer 32A to escape through the holes in outer fabric layer 32B.

Figure 32:
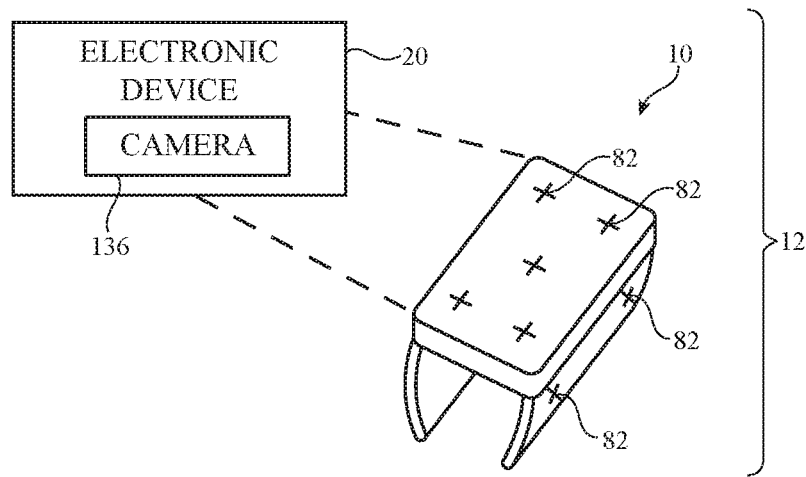
FIG. 32 is a schematic diagram of a system having a finger device with visual markers on fabric and an electronic device having a camera that tracks the visual markers in accordance with an embodiment.

As shown in FIG. 32, external equipment such as electronic device 20 in system 12 may contain sensors such as one or more cameras 136 (e.g., visual light cameras, infrared cameras, etc.). Electronic device 20 may, as an example, form part of an augmented reality (mixed reality) or virtual reality system (e.g., a system that includes a head-mounted device, glasses, a helmet, or other head-mountable support structures). Visual markers 82 may be placed on device 10 and, if desired, on other locations in the user's environment. Markers 82 may be, for example, passive visual markers such as bar codes, cross symbols, or other visually identifiable patterns and may be applied to device 10 and/or other objects such as a tabletop or other work surface.

Markers 82 may, if desired, include light-emitting components (e.g., visual light-emitting diodes and/or infrared light-emitting diodes modulated using identifiable modulation codes) that are detected using cameras. Markers 82 may help inform system 12 of the location of the user's virtual work surface and one or more of the user's fingers as a user is interacting with a computer or other equipment in system 12.

Visual markers 82 on device 10 and/or inertial measurement units in device 10 (e.g., accelerometers, compasses, and/or gyroscopes) may be used in tracking the user's finger locations (e.g., the locations of finger-mounted devices 10) relative to other markers in the user's work area. At the same time, system 12 may display associated visual content for the user. The user may interact with the displayed visual content by supplying force input, motion input (e.g., air gestures), taps, shearing force input, and other input gathered from device 10 by inertial measurement units in device 10 and/or force sensors and other sensors in device 10.

For example, information on the location of finger-mounted device 10 relative to other marks in system 12 may be gathered by control circuitry in device 20 or other electronic equipment in system 12 (e.g., a computer, cellular telephone, or other electronic device coupled to device 20) during operation of system 12 while monitoring device 10 for force input, gesture input (e.g., taps, three-dimensional air gestures, etc.) that indicate that a user has selected (e.g., highlighted), moved, or otherwise manipulated a displayed visual element and/or provided commands to system 12. As an example, a user may make an air gesture such as a left hand wave to move visual content to the left. System 12 may use markers 82 and/or inertial measurement units in device 10 to detect the left hand wave gesture and can move visual elements being presented to the user with a display in device 20 in response to the left hand wave gesture. As another example, a user may select a visual element in the user's field of view by tapping on that element.

In this way, control circuitry in device 20, and/or other control circuitry in system 12 may allow a user to manipulate visual elements being viewed by the user (e.g., virtual reality content or other visual content being presented with a head-mounted device such as augmented reality googles or other device 20 with a display).

Markers 82 on device 10 may be formed from ink on fabric 32, coatings on strands that form fabric 32, surface features on fabric 32, or other suitable structures in device 10. In arrangements where markers 82 are tracked with an infrared camera, marks 82 may be formed from infrared-reflective ink or coatings.

In some arrangements, device 10 may incorporate optical components such as light emitters and/or light detectors. In this type of scenario, it may be desirable to incorporate light-transmissive portions in fabric 32. This type of arrangement is illustrated in FIG. 33.

Figure 33:
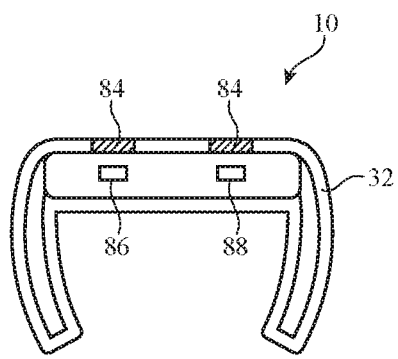
FIG. 33 is a cross-sectional side view of an illustrative finger device having optical components that are aligned with light-transmissive portions of a fabric in accordance with an embodiment.

As shown in the cross-sectional side view of FIG. 33, device 10 may include optical components 86 and 88. Optical component 86 may, for example, be a light emitter and optical component 88 may be a light detector. Fabric 32 may include light-transmissive portions 84 overlapping light emitter 86 and light detector 88. In arrangements where optical components 86 and 88 emit and detect visible light, light-transmissive portions 84 of fabric 32 may be transmissive to visible light. In arrangements where optical components 86 and 88 emit and detect infrared light, light-transmissive portions 84 of fabric 32 may be transmissive to infrared light.

Figure 34:
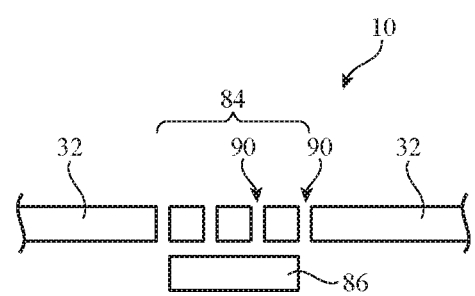
FIG. 34 is a cross-sectional side view of an illustrative finger device having fabric with a light-transmissive region formed from openings in the fabric in accordance with an embodiment.

Light-transmissive portions 84 may be formed using material that is transparent to visible and/or infrared light, or may be formed using openings in fabric 32. This type of arrangement is shown in FIG. 34. As shown in FIG. 34, light-transmissive portions of fabric 32 such as light transmissive portion 84 over optical component 86 may be formed from an array of perforations 90. Perforations 90 may allow light emitted from optical component 86 to pass through openings 90. If desired, perforations 90 may also be formed in fabric 32 over light detector 88 to allow light to pass through fabric 32 to reach detector 88.

Figure 35:
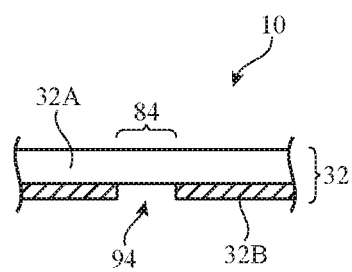
FIG. 35 is a cross-sectional side view of an illustrative finger device having a first transparent fabric portion and a second non-transparent fabric portion with an opening in accordance with an embodiment.

FIG. 35 shows an arrangement in which light transmissive portions 84 of fabric 32 are formed using a two-layer arrangement. Outer layer 32A of fabric 32 may be formed from a transparent (e.g., visible-light-transparent or infraredlight-transparent) material and inner layer 32B of fabric 32 may be formed from a light-blocking (e.g., visible-light-blocking or infrared-light-blocking) material. Outer layer 32A may form a smooth outer surface of device 10. Inner layer 32B may have one or more openings 94 for allowing light from outside of device 10 to reach optical detector 88 and/or for allowing light from light emitter 86 to exit device 10. If desired, both layer 32A and 32B may be fabric layers or one of layers 32A and 32B may be a coating and the other may be a fabric layer. For example, layer 32A may be a fabric layer and layer 32B may be a coating, or vice versa.

The foregoing is merely illustrative and various modifications can be made to the described embodiments. The foregoing embodiments may be implemented individually or in any combination.

What is claimed is:

1. A finger-mounted device configured to be worn on a finger of a user, comprising:
    first and second side body members configured to leave a finger pad of the finger at least partially exposed, wherein each of the first and second side body members has an upper portion and a lower portion coupled by a hinge that allows the lower portion to rotate relative to the upper portion;
    an upper body member that extends between the first and second side body members, wherein the upper body member is configured to at least partially cover a fingernail of the finger;
    fabric covering the first and second side body members;
    electronic components mounted in the upper body member that gather user gesture input;
    a sensor in the first side body portion that detects deformation of a first side portion of the finger resulting from a pressure applied by the finger pad on an external surface; and
    control circuitry that sends control signals to an external electronic device based on the detected deformation of the first side portion of the finger.

2. The finger-mounted device defined in claim 1 wherein the first and second side body members have opposing inner and outer surfaces and wherein the fabric is wrapped around the first and second side body members to cover the inner and outer surfaces of the first and second side body members.

3. The finger-mounted device defined in claim 2 wherein the fabric is adhesively attached to the upper body member.

4. The finger-mounted device defined in claim 3 wherein an interface between the fabric and the first and second side body members is free of adhesive.

5. The finger-mounted device defined in claim 4 wherein the first and second side body members are respectively coupled to the upper body member with first and second additional hinges that allow the first and second side body members to move toward and away from each other.

6. The finger-mounted device defined in claim 1 wherein the fabric comprises elastic material.

7. The finger-mounted device defined in claim 1 further comprising a touch sensor on the first side body member.

8. The finger-mounted device defined in claim 7 wherein the touch sensor has electrodes that are formed from conductive material on the fabric layer.

9. The finger-mounted device defined in claim 7 wherein the fabric comprises conductive strands and wherein the touch sensor has electrodes that are formed from the conductive strands in the fabric.

10. The finger-mounted device defined in claim 1 further comprising first and second actuators coupled to the fabric, wherein the first actuator moves the fabric to move the first side body member and the second actuator moves the fabric to move the second side body member.

11. The finger-mounted device defined in claim 1 further comprising a shape memory structure on the first side body member that provides haptic output in response to a change in temperature.

12. The finger-mounted device defined in claim 1 further comprising a shape memory structure on the first side body member that is used to adjust a tightness of the finger-mounted device on the finger.

13. The finger-mounted device defined in claim 1 further comprising breathability features in the fabric that increase air circulation through the fabric, wherein the breathability features are selected from the group consisting of: through-holes, pits, and bumps.

14. The finger-mounted device defined in claim 1 wherein the fabric covers the upper body member and wherein the fabric comprises an infrared-reflective ink that forms a visual marker that is tracked using an external infrared camera.

15. The finger-mounted device defined in claim 1 wherein the fabric covers the upper body member, wherein the electronic components comprise an optical component, and wherein the fabric has a light-transmissive portion over the optical component.

16. The finger-mounted device defined in claim 15 wherein the light-transmissive portion comprises an opening in the fabric.

17. A finger-mounted device configured to be worn on a finger of a user, comprising:
    first and second arms configured to leave a finger pad of the finger at least partially exposed;
    a magnetic hinge coupled between the first and second arms, wherein the magnetic hinge allows the first and second arms to move towards and away from each other;
    fabric that wraps around the first and second arms; and
    electronic components that are covered by the fabric.

18. The finger-mounted device defined in claim 17 wherein the first and second arms are molded to the fabric.

19. A finger-mounted electronic device configured to be worn on a finger of a user, the finger-mounted electronic device comprising:
    first ribs that extend along a first side of the finger, wherein each of the first ribs is free to move relative to the other first ribs;
    second ribs that extend along a second side of the finger, wherein each of the second ribs is free to move relative to the other second ribs;
    a first fabric portion coupled to the first ribs, wherein the first fabric portion spans across a first gap between two of the first ribs;
    a second fabric portion coupled to the second ribs, wherein the second fabric portion spans across a second gap between two of the second ribs;
    a hinge coupled between the first ribs and the second ribs, wherein the hinge is configured to rest on a top portion of the finger and allows the first ribs to rotate relative to the second ribs about a hinge axis, wherein the first ribs are configured to rotate independently of one another about the hinge axis, and wherein the second ribs are configured to rotate independently of one another about the hinge axis; and
    a sensor located on a side portion of the finger that detects user gesture input from the finger.

20. The finger-mounted electronic device defined in claim 19 wherein the fabric comprises strands of material and wherein the strands of material are intertwined with the first ribs and the second ribs.

* * * * *